(12) United States Patent
Gervasi

(10) Patent No.: US 7,093,891 B2
(45) Date of Patent: Aug. 22, 2006

(54) HATCH WATER DIVERTER

(76) Inventor: Leonard A. Gervasi, 294 S. Hope Chapel Rd., Jackson, NJ (US) 08527

( * ) Notice: Subject to any disclaimer, the term of this patent is extended or adjusted under 35 U.S.C. 154(b) by 79 days.

(21) Appl. No.: 11/033,522

(22) Filed: Jan. 12, 2005

(65) Prior Publication Data
US 2005/0264030 A1 Dec. 1, 2005

Related U.S. Application Data

(60) Provisional application No. 60/574,979, filed on May 28, 2004.

(51) Int. Cl.
B60J 7/00 (2006.01)

(52) U.S. Cl. ................ 296/208; 296/165

(58) Field of Classification Search ........... 296/208, 296/213, 146.8, 106, 76, 173, 165, 176
See application file for complete search history.

(56) References Cited

U.S. PATENT DOCUMENTS

| | | | |
|---|---|---|---|
| 3,082,033 A * | 3/1963 | Bosher | 296/76 |
| 3,863,977 A * | 2/1975 | Hardinge | 296/161 |
| 3,879,080 A * | 4/1975 | Freeman | 296/26.06 |
| 4,049,309 A | 9/1977 | Seal | |
| 4,181,348 A * | 1/1980 | Whitley et al. | 296/165 |
| 4,504,049 A * | 3/1985 | Straub | 296/165 |
| 4,544,195 A * | 10/1985 | Gunn | 296/165 |
| 4,867,502 A * | 9/1989 | Sylvester et al. | 296/161 |
| 4,877,283 A | 10/1989 | Little et al. | |
| 5,209,546 A | 5/1993 | Hasegawa et al. | |
| 5,669,655 A * | 9/1997 | Hammond | 296/165 |
| 5,820,189 A * | 10/1998 | Tew | 296/164 |
| 5,832,862 A | 11/1998 | Hulten | |
| 5,957,525 A * | 9/1999 | Nelson | 296/165 |
| 6,145,917 A * | 11/2000 | Ishii et al. | 296/146.8 |
| 6,505,878 B1 | 1/2003 | Mascolo | |
| 6,971,707 B1 * | 12/2005 | Mullan | 296/172 |

* cited by examiner

*Primary Examiner*—Kiran B. Patel
(74) *Attorney, Agent, or Firm*—Charles I. Brodsky

(57) ABSTRACT

In an automotive hatch back vehicle, foldable bonnets are coupled between an underside of the hatch lid and the run-off channels on both the driver and passenger side of the vehicle, pleated to fold outwardly as the hatch lid is raised to divert water accumulations on the lid into the channels, and to fold away inwardly into the vehicle as the lid is lowered.

14 Claims, 2 Drawing Sheets

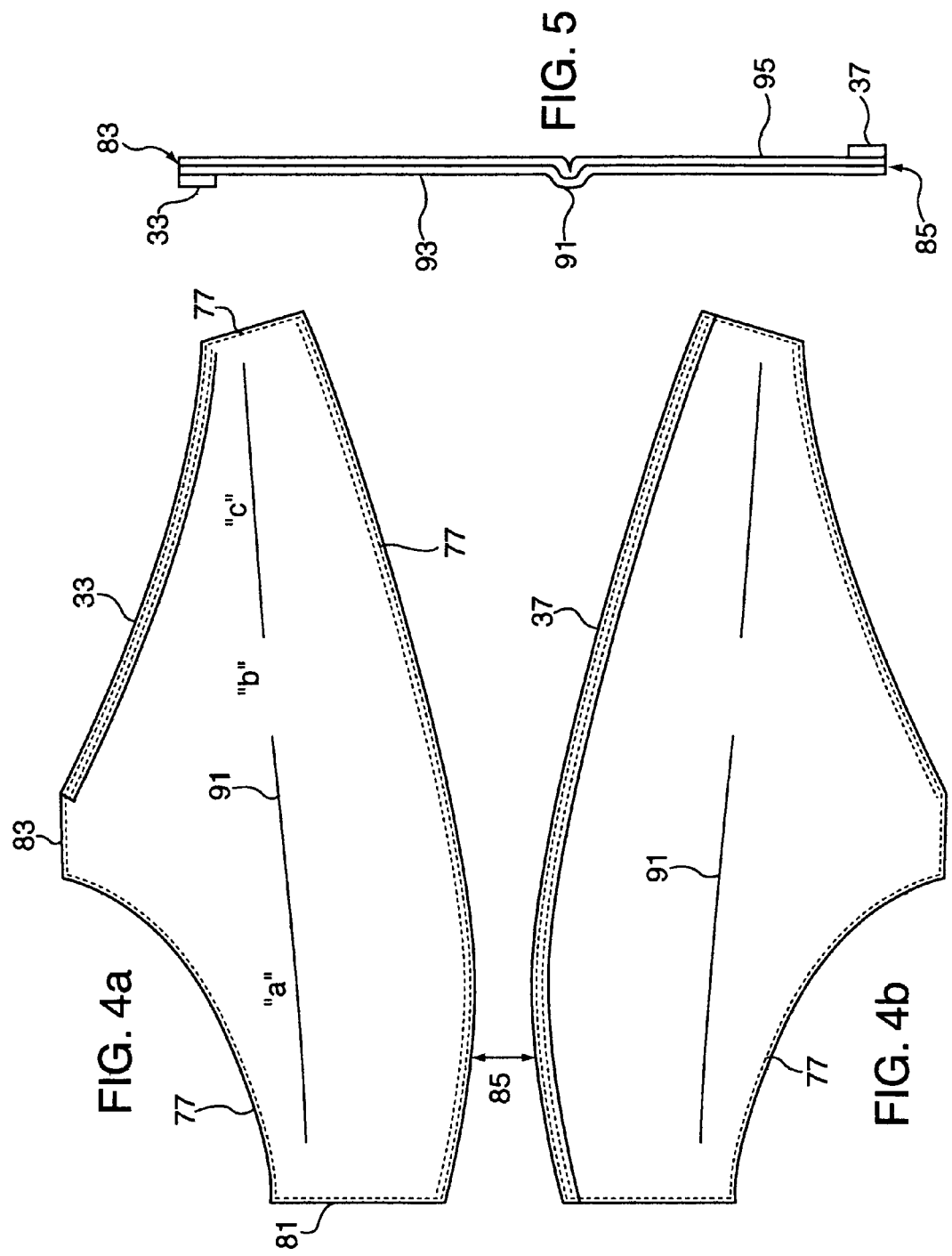

HATCH WATER DIVERTER

CROSS-REFERENCE TO RELATED APPLICATIONS

A provisional application describing this invention was filed May 28, 2004 and assigned Ser. No. 60/574,979

STATEMENT REGARDING FEDERALLY SPONSORED RESEARCH OR DEVELOPMENT

Research and development of this invention and Application have not been federally sponsored, and no rights are given under any Federal program.

REFERENCE TO A MICROFICHE APPENDIX

Not Applicable

BACKGROUND OF THE INVENTION

1. Field of the Invention

This invention relates to automotive hatch-back vehicles, in general, and to the drainage systems employed with their hatch lids, in particular.

2. Description of the Related Art

Automotive hatch-back vehicles are often designed with channels and weep holes to drain rainwater from their hatch lids. Experience has shown that some designs—such as those of the Pontiac Trans Am, the Chevrolet Camaro, the Ford Mustang and the Ford Escort—do not work very well; in them, when the hatch lid is raised, the rainwater gushes from the run-off channels into the interior of the vehicle, wetting the rear seat, the rear seat speaker installations, the carpeting in the hatch area and the rear seat belt retractors (which, in freezing temperatures, then become "locked" and inoperative). Experience has also shown that such channels exhibit a tendency to accumulate rainwater, so that even when the vehicle has dried, raising the hatch lid results in the accumulations dripping into the hatch area once more. This problem is particularly exasperating after the vehicle has been washed clean and then dried off—in that then raising the hatch lid cascades the car-wash water in, to damage the interior, to rust various panelings, and to ruin the owner's overall investment in the vehicle in general.

SUMMARY OF THE INVENTION

The present invention encompasses a hatch water diverter, or "hatch bonnet", which is removably securable between the underside of the hatch interior at its top and the run-off channel at its bottom. Installed both on the driver's side and on the passenger's side of the vehicle, such diverter is pleated horizontally so that when the hatch lid is closed, each diverter is folded inwardly toward the hatch area; when the hatch lid is raised, on the other hand, the pleat extends each diverter to face outwardly. Preferably constructed of a material which drains water easily (such as vinyl), the diverters thus shunt the cascading channel water accumulations outside the vehicle when the hatch lid is raised, and folds inwardly be concealed from view when the lid is closed. As will be appreciated, such pleat not only forces the diverter to fold inwardly every time, but provides it with a rigidity so as to allow it to withstand wind occurrences when extended. Being removably securable with the underside of the hatch lid and with the run-off channel by hook-and-loop adhesives, the diverters can also be color coordinated to match the interior colors of the vehicle's seating areas, —and where composed of a "2-piece" lamination, a color coordination on one side with the exterior of the vehicle could be had as well as a color coordination with its interior components.

BRIEF DESCRIPTION OF THE DRAWINGS

FIGS. 4a and 4b are inverted side views of the hatch water diverter of FIG. 3; and FIG. 5 is a side view of the diverter once installed.

DETAILED DESCRIPTION OF THE INVENTION

Figure 1:
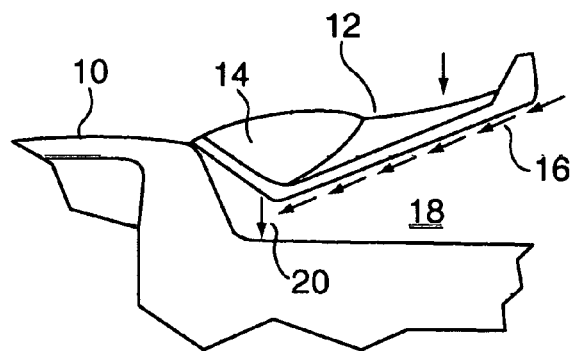
FIG. 1 is a partial driver's side view of the problem of water intrusion into the interior of the hatch area of an automotive hatch-back vehicle as typified with the Trans-Am®, Camaro®, Mustang® and Escort® vehicles identified above.

In FIG. 1, the roof of the automotive hatch-back vehicle is shown at 10, while the hatch-back lid is shown at 12 in a raised position, with its rear window glass shown at 14. Run-off water flows in a channel in the direction shown at 16, but drips or cascades undesirably into the interior hatch area 18 as shown at reference numeral 20. Such an intrusion of rainwater accumulations wets the interior carpet area of the hatch, the rear seats, any speaker installation located there, the rear seat belt retractors, and anything stored within the hatch area.

Figure 2:
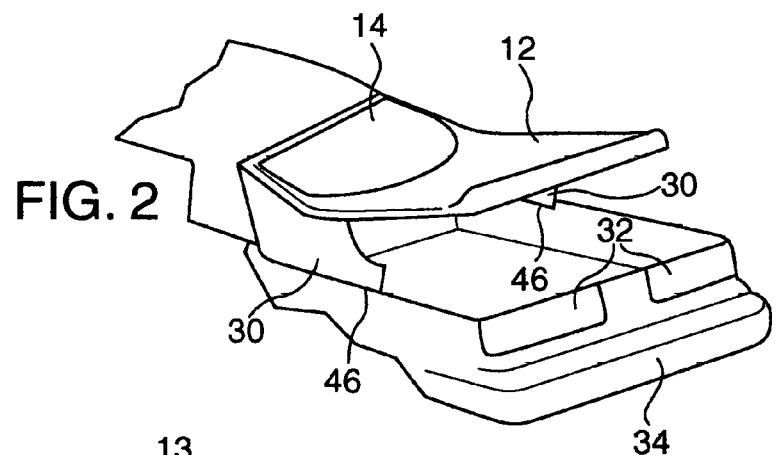
FIG. 2 is a partial driver's side view of such a vehicle employing the hatch water diverter of the invention.

FIG. 2 shows the placement of a pair of hatch water diverter bonnets of the invention 30, detachably secured to the underside of the hatch 12 and to the run-off channels 46 respectively. Reference numeral 32 identifies the vehicle taillights, with its bumper shown at 34.

Figure 3:
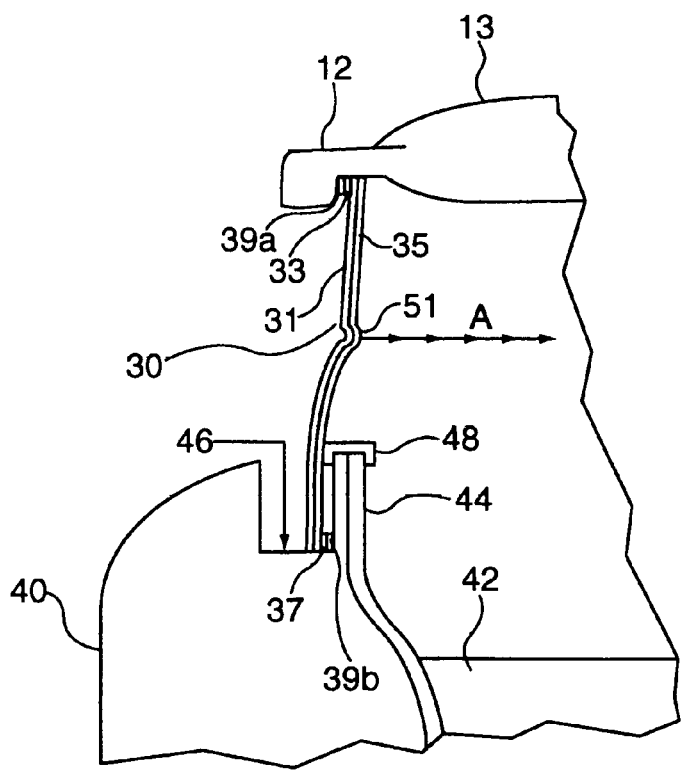
FIG. 3 is a partial passenger's side view of such an automotive hatch-back vehicle with the hatch water diverter of the invention in position according to a preferred embodiment of the invention.

Reference numeral 40 in FIG. 3 represents a rear exterior panel of the hatch-back vehicle, whose interior carpet is shown at 42 along the lower end of the vehicle's interior panel 44. With the hatch lid 12 in its raised position (reference numeral 13 representing the top of the hatch), the run-off channel shown at 46 is provided with a factory water seal 48 for any water accumulation. In accordance with the invention, the hatch water diverter 30 is shown secured at its lower end within the channel 46 at the water seal 48, both on the right side and left sides of the hatch underside. A 2-layer bonnet 30 is shown (of vinyl or any other material which does not readily absorb water), with one of the layers 31 having a Velcro®-loop 33 sewn at its upper end, and with the other layer 35 having a similar Velcro®-loop 37 sewn at its lower end. A first Velcro®-hook 39a is adhesively secured at the underside of the hatch lid, while a second Velcro®-hook 39b is adhesively secured in the run-off channel 46. Removable securement of the water diverter 30 into the vehicle is by joining the Velcro®-loop 33 with the Velcro®-hook 39a on the one hand, and joining the Velcro®-loop 37 with the Velcro®-hook 39b on the other hand. With this inclusion, water accumulations flowing from the hatch lid upon its raising, and in the water channel 46 are diverted away from the interior panel 44 and carpet 42 when the hatch lid 12 is opened. In this respect, the layer 31 could be color coordinated to match with the exterior of the vehicle, while the layer 35 could be color coordinated to match with its interior. Reference numeral 51 identifies a center pleat within the layers 31, 35 of a construction to fold inwardly along the arrow A when the lid 12 is closed.

FIGS. 4a and 4b respectively show exterior and interior views of the hatch water diverter 30 with the interior view being rotated 180° downward for ease of understanding. The sewn Velcro-loop is illustrated as 33 in FIG. 4a, and as 37 in FIG. 4b. The two layers 31, 35 are stitched together along their respective edges, shown at 77. The front of the hatch bonnet is indicated at 81, with its top and bottom sections being shown at 83, 85, respectively. With FIG. 5 showing a side view of the 2-layer device 30, its center pleat is shown at 91, with the exterior side of the diverter 30 being shown at 93 and its interior side at 95.

The pleat 91 in FIGS. 4a and 4b give rigidity to the diverter under windy conditions, and ensures that when the hatch is closed, the diverter 30 automatically folds inwardly of the hatch area of the vehicle. When manufactured of vinyl, for example, the diverter can easily be rolled up for packaging in a plastic tube when originally sold, or for being stored in it after use. The pleat 91 may be formed by folding the two vinyl pieces together in half lengthwise, and sewing a first stitch there across "a"; a space "b" is then left, followed by a second stitch "c". This produces a water tight pleat.

Understanding that the particular shape of the vinyl material is such as to fit for each model of hatch-back vehicle manufacture, one construction (for the Pontiac Trams-Am, for example) utilizes a Velcro-loop strip 33 of some 17-½ inches in length sewn at the *top*, and a V*elcro-loop* strip 37 of 28-½ inches sewn at the *bottom*. T*he* pleat 91 with such construction may be formed with a stitch "*a*" of 12 inches, a spacing "b" of 3 inches, and a stitch "c" of 6 inches. The automotive hatch-back vehicle will have a matching piece of adhesive backed Velcro-hook of 28-½ inches attached to the *run-off* channel 46 below the water seal 48, and a piece of adhesive backed V*elcro-hook* of 17-½ inches attached to the underside of the *hatch*. T*he* stitching 77, in this *respect*, serves to join or *laminate*, the two layers of vinyl (*or similar*) material with the double row of V*elcro-type adhesives*.

With the inclusion of the hatch bonnet, opening the hatch lid shunts the water away from the interior area and into the intended water run-off channel 46—thus serving as a diverter, and as a protector of the carpet, installed speaker, rear seats, and rear seat belt retractors—; when the lid is pushed down to close the hatch, the pleat 91 forces the diverter to fold toward the interior of the hatch, hiding it from view from the outside. Fastening the diverter with the Velcro-type adhesive permits an ease of removal and reinstallation when desired.

As will be readily appreciated by those skilled in the art, a one-piece diverter may also be employed, instead of the two piece construction of layers 31 and 35, especially where heavier materials are available. This would serve to give the same type of rigidity as the "two-layer" construction, but without separate color coordinations to the outside and inside vehicle colors. With the "two-layer" construction, the exterior color might be "red" and the interior color "black" (to color coordinate with a bright red color of the hatch-back vehicle and with a black interior), while a "one-layer" diverter might be "black" on both sides. In either event, the utility of the bonnet and the method of its installation would continue the same.

While there have been described what are considered to be preferred embodiments of the present invention, it will be readily appreciated by those skilled in the art that modifications can be made without departing from the scope of the teachings herein. For at least such reason, therefore, resort should be had to the claims appended hereto for a true understanding of the scope of the invention.

I claim:

1. In an automotive vehicle, a combination comprising:
   a raisable hatch lid;
   a run-off channel on each of a passenger and driver side of said vehicle for weeping away outwardly of said vehicle water accumulating on said lid when in a lowered position;
   first and second water diverter bonnets coupled with said lid and said run-off channels of each of said vehicle sides; and
   with each of said bonnets being removably secured at an upper end thereof with an underside of said lid, and being removably secured at a lower end thereof with said run-off channel;
   characterized in that, upon the raising of said lid, each of said bonnets operate to divert any water accumulations still remaining on said lid into said run-off channels for further dispersal outwardly of said vehicle.

2. The combination of claim 1 wherein each of said bonnets when secured is coupled to fold inwardly into said vehicle when said hatch lid is lowered, and to unfold outwardly therefrom when said hatch lid is raised.

3. The combination of claim 2 wherein each of said bonnets is composed of a single layer, pleated inwardly along its length, to fold into said vehicle as said hatch lid is lowered.

4. The combination of claim 2 wherein each of said bonnets is composed of a single layer, pleated inwardly along its length, to fold into said vehicle as said hatch lid is lowered, and to fold outwardly as said hatch lid is raised.

5. The combination of claim 4 wherein each of said bonnets is composed of a material substantially impervious to water.

6. The combination of claim 5 wherein each of said bonnets is composed of a material resistant to wind.

7. The combination of claim 6 wherein each single layer bonnet is of a color coordinated with an exterior color of said automotive vehicle.

8. The combination of claim 2 wherein each of said bonnets is removably securable with said hatch lid and said run-off channels by hook-and-loop adhesive couplings.

9. The combination of claim 8 wherein each of said bonnets is removably securable with said hatch lid and said run-off channels by an adhesive hook on upper and lower ends thereof, with adhesive loops on said underside of said lid and at said run-off channels.

10. The combination of claim 2 wherein each of said bonnets is composed of a pair of joined layers, pleated inwardly along their lengths, to fold into said vehicle as said hatch lid is lowered.

11. The combination of claim 2 wherein each of said bonnets is composed of a pair of joined layers, pleated inwardly along their lengths, to fold into said vehicle as said hatch lid is lowered, and to fold outwardly as said hatch lid is raised.

12. The combination of claim 11 wherein each of said joined layers is composed of a material substantially impervious to water.

13. The combination of claim 12 wherein each of said layers is composed of a material resistant to wind.

14. The combination of claim 13 wherein one of said layers is of a color coordinated with an exterior color of said automotive vehicle, and one of said layers is of a color coordinated with an interior color of said vehicle.

* * * * *